SIGNATURE MACHINE

Original Filed Dec. 17, 1962 5 Sheets-Sheet 1

Inventors
WILLIAM B. McCAIN
JAMES F. COSGROVE
By Wallace, Kinzer and Dorn
Attorneys Inventors
WILLIAM B. McCAIN
JAMES F. COSGROVE
By Wallace, Kinzer and Dorn
Attorneys

SIGNATURE MACHINE

Original Filed Dec. 17, 1962 5 Sheets-Sheet 3

Inventors
WILLIAM B. McCAIN
JAMES F. COSGROVE
By Wallace, Kinzer and Dorn
Attorneys

SIGNATURE MACHINE

Inventors
William B. McCain
James F. Cosgrove
By Wallace, Kinzer and Dorn
Attorneys Inventors
William B. Mc Cain
James F. Cosgrove
By Wallace, Kinzer and Dorn
Attorneys

United States Patent Office 3,275,210

Patented Sept. 27, 1966

3,275,210
SIGNATURE MACHINE

William B. McCain, Hinsdale, and James F. Cosgrove, Western Springs, Ill., assignors to Chicago Machinery Laboratory, Inc., Chicago, Ill., a corporation of Illinois Original application Dec. 17, 1962, Ser. No. 245,322. Divided and this application Jan. 25, 1965, Ser. No. 427,624

6 Claims. (Cl. 227—82)

This invention relates to a signature machine in which books are formed from individual juxtaposed signatures, and in particular to controls that are effective to control operations on the signature groups moving through the machine.

This application is a divisional application of co-pending application Serial No. 245,322, filed December 17, 1962.

In a signature machine of the kind under consideration, individual signatures in folded form are advanced from hoppers and dropped onto a saddle under circumstances where one signature is gathered atop another on the saddle to afford a signature group. Thereafter, the signature groups are advanced to a stitching station where staplers or the like are effective to join the signatures to complete a book.

It is known to associate calipering apparatus in such a signature machine to caliper the signature groups prior to stitching to determine if the signature group includes the correct number of pages. Thus, the calipering apparatus is intended to measure the thickness of the signature group to determine if a signature is missing or if too many signatures are present, or in other words if the signature group moving therepast is on the too thick or too thin side of correct book thickness. If there is a departure from correct book thickness, means are then operated to control subsequent operations in the machine.

It is undesirable to stitch the signature group having a departure from the correct book thickness and accordingly an object of the present invention is a new and improved manner of preventing stitching of the books by moving the stitch wire to a position out of an operative position within the stitching head to prevent the forming and driving of the staple into the defective book.

More specifically, an object of the present invention is to prevent the stitching of a defective book by pivoting the stitch wire out of the wire feeding mechanism to prevent the forming and driving of a staple into the deflective book.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

*General description*

Figure 1:
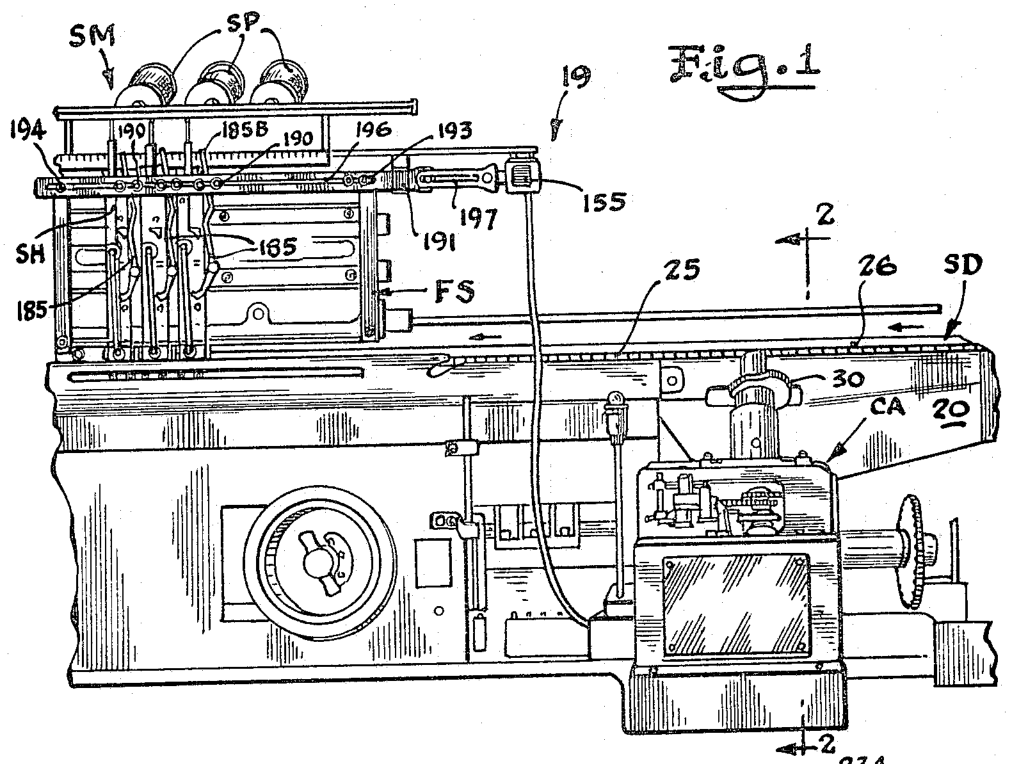
FIG. 1 is a perspective view of a portion of a machine constructed in accordance with the present invention.
Figure 2:
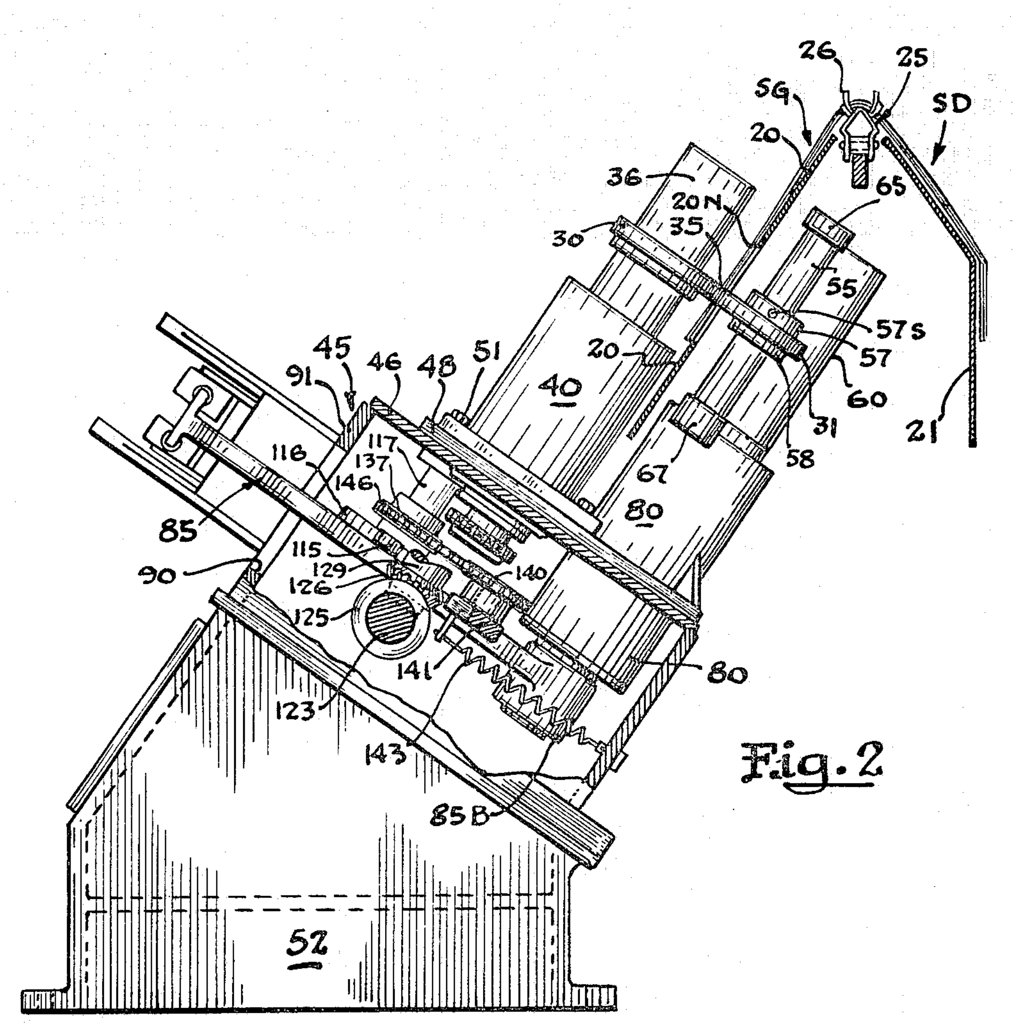
FIG. 2 is a sectional view taken substantially on the line 2—2 of FIG. 1.

The essential components of a signature machine 19 constructed under the present invention are illustrated in FIG. 1 as comprising an elongated saddle SD which afford a horizontal guide for the signature groups as will be explained. The saddle SD, as shown in FIG. 2, includes a pair of support plates 20 and 21 oriented in a generally inverted V-shaped disposition, which is to say that the plates 20 and 21 affording the saddle SD are sloped downwardly and outwardly, as will be apparent in FIG. 2. These plates are separated at the upper edges thereof to afford a channel in which a conveyor belt 25 is disposed for movement along a horizontal conveyor path.

Upright feeder elements 26, FIG. 2, are secured to the conveyor belt in a spaced relationship, and the spacing will be such that these will be effective on the trailing edge of a signature group SG so as to advance the individual signature groups SG, along the conveyor path in the direction of a stitching mechanism SM, FIG. 1.

Thus, signature gathering mechanism, now shown, will be afforded at a right-hand end of the machine not visible in FIG. 1, and such gathering mechanism, as is well known in the art, is effective to feed individual signatures in folded form so that these are dropped on to the saddle SD to be picked up by the conveyor elements 26. The signature groups, as will be apparent from FIG. 2, are draped on the saddle SD with the backbone or fold of each at the apex of the saddle in position to be pushed by the conveyor elements 26. Thus, half the sheets of the signature group at one side of the fold move along the front or left-hand saddle plate 20, FIG. 2, and the other half move along the rear or right-hand saddle plate 21.

The individual signatures in a folded state are initially stacked in individual hoppers of the signature gathering mechanism, these hoppers being spaced above the saddle SD, and the feeding of the signatures from the hoppers is such that one signature will be dropped atop another on the saddle to afford a signature group SG, FIG. 2, which is inclusive of a predetermined number of individual folded signatures. Gathering mechanism of the aforesaid kind is typified by the structure disclosed in my co-pending application Serial No. 8,629, filed February 15, 1960, now Patent No. 3,087,721.

The stitching mechanism SM, FIG. 1, is inclusive of a plurality of spaced, vertically disposed stitching heads SH of identical construction, and these stitching heads are effective in normal operation to join the signatures in a group SG to complete a book. The stitching heads SH are in reality staplers, and wire for the staples is supplied from individual spools SP, FIG. 1, in a manner to be described in detail hereinafter.

It is important of course to assure that a completed book will contain the correct number of individual signatures. Under the present invention this is determined, prior to joining the signatures into books, by calipering apparatus CA, FIG. 1, of novel construction including a pair of calipering rollers between which a signature group to be calipered moves. It will be observed in FIG. 1 that the calipering apparatus is located at a calipering station well to the right of the stitching means, and as will be described in detail hereinafter the calipering apparatus is effective to measure the thickness of a signature group, to determine if the measured thickness represents a complete book, prior to this group reaching the stitching mechanism.

It may here be explained that the calipering apparatus is effective to measure what amounts to the thickness of the signature group along one side of the fold on the saddle SD. Since the correct number of pages and thickness thereof in a correct signature group will be predetermined, the calipering apparatus will be adjusted to caliper this thickness prior to each run of the machine. If there is a departure from this standard or datum thickness either in a too thick or too thin sense, this condition is indicated by movement of a roller in the caliper apparatus out of datum position, whereupon the stitching heads are to be rendered ineffective to staple the incomplete or bad book in a manner to be explained.

Other relationships may be established as a consequence of detection of a book of improper thickness by the calipering apparatus. Thus, it may be mentioned that in a machine of the kind under consideration it is common practice to separate the good books from the bad books at the delivery end of the machine by having resort to so-called switch fingers. These switch fingers are usually solenoid-controlled so as to be effective to guide the unstapled signatures in a defective or incomplete signature group to a collecting station. The signatures thus separated, not having been stapled or stitched, can then be reallocated to the supply hoppers.

The feeder elements 26, as noted, are secured to the conveyor belt 25 in spaced relationship. Thus, the elements 26 are in the form of U-shaped pins having the legs thereof projecting upward and the bight or bend thereof removably pressed through openings in the individual inverted V-shaped plate elements 25A that afford the conveyor belt. Thus, the feeder elements or pins 26 can be varied in spacing to establish particular feed rates for the signature groups. Concurrently, the speed of the conveyor will be changed. This in essence is a timing proposition, and an essential feature of the present invention is that the caliper apparatus can be easily adjusted to be synchronized as a necessary concomitant to the rate and speed of movement of the feed pins 26, and therefore the signature groups, past the caliper apparatus.

*Wire feed control*

In the event that a signature group of improper thickness is detected by the calipering mechanism, there is to be an effect on subsequent operations performed on this signature group in the machine. Thus, for example, the improper signature group is not to be stitched, and the attendant control emanates from closure of one of two microswitches, diagrammatically shown as switch contacts 94 and 95, FIG. 6. Such operation of a microswitch of course occurs in the calipering cycle of the machine, which is a cycle that occurs before the stitching cycle, or the sorting cycle at the delivery end of the machine. In view of this, information that a bad book has been detected is to be stored as will hereinafter be described, and the timing is such that when the improper signature group reaches the stitching heads SH, a solenoid 155, FIG. 1, is to be energized to prevent the stitching heads from being effective on the improper signature group. This is accomplished by a stitching head constructed in the manner disclosed in FIG. 3, or in the manner disclosed in FIG. 10, as explained in more detail hereinafter.

Figure 3:
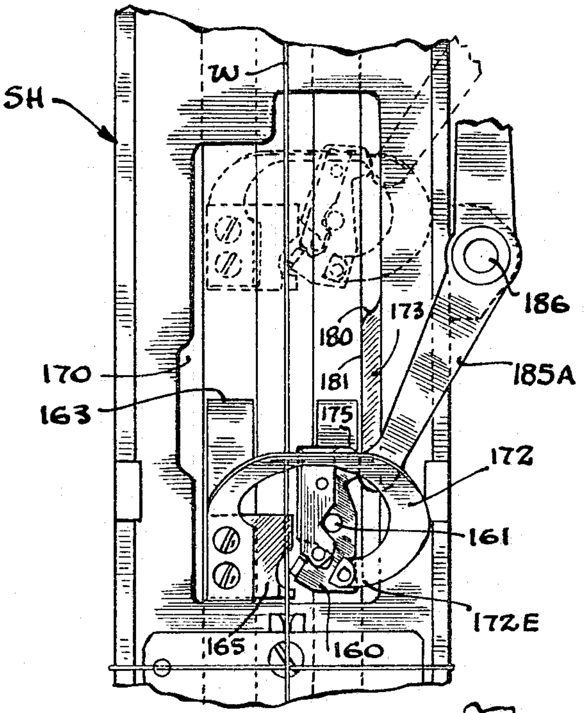
FIG. 3 is a fragmentary front elevation of a stapling head used in the present machine.

Referring now to FIG. 3, the stitching heads SH are of a known construction except for the modification under and in accordance with the present invention. Thus, the stitching heads SH are in the forms of Bostitch staplers of the 18D type each equipped with a wire feed dog or so-called grip holder 160, FIGS. 3 and 4, that is pivotally supported on a pin 161 carried by a vertically movable bender bar 163.

The dog 160 includes a hardened steel toe 164 that is disposed opposite a lug or anvil 165 that is carried by the bender bar 163 on which the dog 160 is pivotally mounted. The anvil 165 is formed with a guide groove 165G in which the wire W is disposed to feed, and during a feed action performed thereon, the hardened steel toe 164 of the dog 160 is effective to clamp the wire W in the guide groove 165G when undergoing downward movement in the stapling head.

Thus, the bender bar 163 is disposed in a vertically oriented recess 170, FIG. 3, for vertical movement therein. The manner in which the bar is raised and lowered constitutes no part of the present invention, and it suffices to explain that pivotal movement of the dog 160 is partly under control of a leaf spring 172 and a fixed cam surface 173. The leaf spring 172 is carried by the bender bar 163, and one end 172E thereof bears against the dog 160 to urge the same in a clockwise direction as viewed in FIGS. 3 and 4 so as to bring the hardened toe 164 against the wire W that is guided in the anvil 165. This is the condition that prevails when the bender bar 163 is in the dotted line position illustrated in FIG. 3 at a time when the bender bar 163 is in its uppermost position just ready to advance downward the next length of wire needed for the staple to be formed, or in other words at a time when a signature group to be joined into a book is nearing the stitching station.

As the dog 160 is forced downward from the dotted line position in FIG. 3, the wire is fed thereby and continues to be fed until a toe 175 at the right hand side of the gripper 160 as viewed in FIG. 3 strikes the inclined upper end 180 of the cam 173. This engagement of the gripper 160 with the cam surface 180 pivots the gripper counterclockwise as viewed in FIG. 3. Resultantly, the gripper is released and is held released as the toe 175 thereon moves downward along the flat surface 181 of the cam 173 to the full line position of the gripper 160 shown in FIG. 3.

In other words, there is no wire feed during the interval that the toe 175 on the feed dog 160 is traveling on the flat face 181 of the cam 173. Therefore, at the bottom of the full downward stroke of the bender bar, the gripper 160 does not grip the wire. At this point it should be mentioned that a driver (not shown) is effective on the upstroke of the bender bar to hold the gripper 160 in its released position so that it merely glides past the wire W. This condition prevails until the bender bar is arrested at the top of its stroke when the feed dog reaches its dotted line position in FIG. 3, and thereafter over-travel of the driver (not shown) with respect to the arrested bender bar permits spring 172 to take over and urge the gripper 160 to its wire gripping position shown by dotted lines in FIG. 3. These movements are described in detail in U.S. Patent No. 1,252,011.

Figure 5:
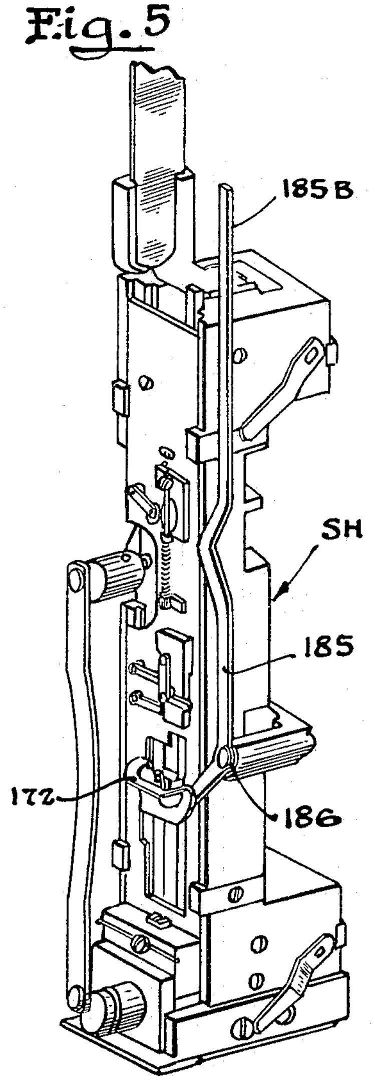
FIG. 5 is a perspective view of a stapling head aforesaid.

Under the present invention, a lever 185, FIG. 5, is associated with each stitching head at the stitching station as will be noted in FIG. 1. Each lever 185 is relatively long in nature and is pivoted on a pin 186 that is secured to the bender bar of the stitching head for up and down movement with the bender bar. The lower portion of each lever 185 includes an inwardly bent leg 185A, FIG. 3, having a projection 187 at the free end thereof adapted to travel with and opposite the toe 175 of the wire gripper 160.

Each wire feed control lever 185 includes a relatively long upward extension 185B, FIGS. 1 and 5, and the upper portions thereof are embraced by respective pairs of guide rollers 190, FIG. 1, that are carried by a horizontally reciprocal bar 191. The bar 191 is guided for accurate movement in a horizontal plane on the front face of the frame structure FS, FIG. 1, associated with the stapler heads, and such guiding relationship is established by guide pins as 193 and 194 that are secured to the frame structure FS and which are disposed in an elongated slot 196 in the control bar 191.

The right-hand end of the control bar 191 as viewed in FIG. 1 is connected by a link 197 to the armature of the solenoid 155.

In the unenergized state of the solenoid 155, each lever 185 is disposed in the position illustrated in FIGS. 1 and 3, and in this position each lever 185 merely moves with the bender bar 163 in each stapling cycle without any effect on the associated wire gripper 160. However, when solenoid 155 is energized and held energized due to an imperfect book being calipered, its armature is effective to pull the control bar 191 to the right as viewed in FIG. 1. This operation is timed to occur simultaneously with the wire grippers reaching the dotted line position illustrated in FIG. 3, or the full line position illustrated in FIG. 4, just prior to the descent of the bender bars 163.

Figure 4:
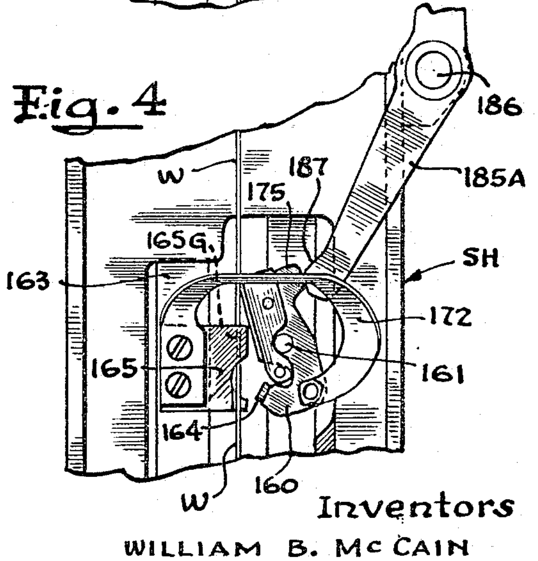
FIG. 4 is a fragmentary elevation similar to FIG. 3 but showing a different relationship of parts.

When the control bar 191 is pulled to the right, the levers 185 are pivoted clockwise as viewed in FIG. 3 so as to strike the gripper toes 175, thereby kicking the wire grippers counterclockwise to a wire releasing position illustrated in FIG. 4. Consequently, on the downstroke of the bender bar, when normally wire would be fed for staple formation, the wire feed dogs 160 are held in released position because, as noted above, the levers 185 move with the bender bar which carries the wire feed grippers 160.

Figure 6:
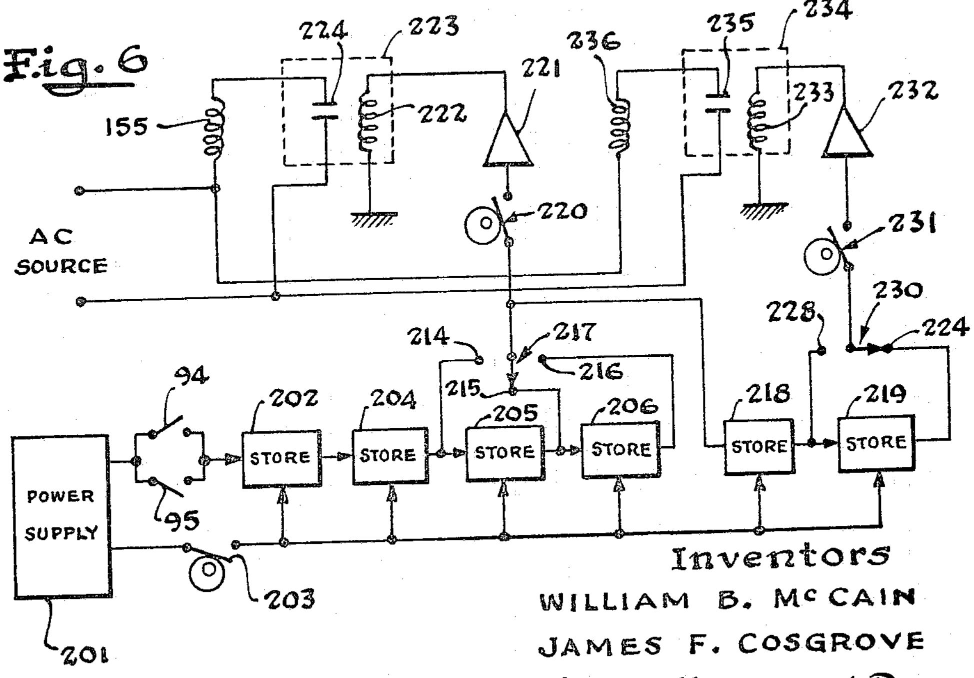
FIG. 6 is a simplified schematic diagram of the electrical operating circuit of the machine.

FIG. 6 illustrates, in simplified schematic form, the electrical operating circuit controlled by the "thick" and "thin" caliper actuated switches 94 and 95. This circuit and associated parts to be described hereinafter can be conventionally contained within the base structure.

As shown in FIG. 6, the switches 94 and 95 are connected in parallel with each other between a power supply circuit 201 and a first storage circuit 202. The storage circuit 202 may be of conventional construction and may, for example, comprise a bistable trigger circuit actuatable between a first storage or normal condition and a second storage condition in response to the application of an appropriate input signal. Magnetic core circuits and transister circuits of this general kind are well known in the electronic arts.

In addition to the input circuit comprising the switches 94 and 95, the storage circuit 202 is provided with a reset circuit including a cam-actuated switch 203 that connects the storage circuit 202 to the power supply 201.

A second storage circuit 204 is connected to the output of the first storage circuit 202. The circuit 204 may be essentially similar to the circuit 202 and again comprises a bistable trigger circuit. The output of the circuit 204 is connected to a third storage circuit 205 which, in turn, is connected to an additional storage circuit 206. Each of the storage devices 204–206 is provided with a reset circuit connection through the cam-actuated switch 203. In addition, the output circuits of the storage devices 204, 205 and 206 are connected to the terminals 214, 215 and 216, respectively, of a selector switch 217. The selector switch 217, in turn, is connected to the input of an additional storage circuit 218 comprising a bistable storage device essentially similar to the devices 202, 204, 205 and 206. The output circuit of the device 218 is connected to a further storage device 219 of generally similar construction. Each of the storage units 218 and 219 is provided with a reset circuit connection through the cam-actuated switch 203.

The selector switch 217 is also connected, through a cam-actuated switch 220, to an amplifier-driver circuit 221 connected to the operating coil 222 of a stop-stitch solenoid control relay 223. The relay 223 includes a pair of normally open contacts 224 that are connected in series with the energizing circuits for the stop-stitch solenoid 155, FIG. 1.

The two storage devices 218 and 219, on the other hand, are individually connected to the input terminals 228 and 229, respectively, of a selector switch 230. The selector switch 230 is connected through a cam-actuated switch 231 to an amplifier-driver circuit 232 that is connected to the operating coil 233 of a control relay 234. The control relay 234 includes a pair of normally open contacts 235 that are connected in series with the energizing circuit of a solenoid 236 which in turn is connected to the so-called "switch delivery" device (not shown) as it is styled in the art, which is the sorting or feed control device used to separate the imperfect from the perfect books at the delivery end of the machine. The switch delivery fingers 218 shown in FIG. 2 of Patent No. 1,644,192 are an early example of this in the art, as in FIG. 3 of Patent No. 1,831,497. Hence, further explanation or showing in this regard is not necessary except to note that the switch delivery fingers in the present instance are controlled by the solenoid 236, FIG. 6, rather than by a mechanical linkage as in the two above-noted patents.

In considering operation of the circuit shown in FIG. 6, it may first be assumed that, in a given sequence of operations, the sensing switches 94 and 95 are not closed. This would be the normal condition of operation, in which the signatures being processed by the machine fall within the limits established by the caliper switches. As long as this condition is maintained, the storage circuits 202, 204, 205, 206, 218 and 219 remain in a given operating condition in which they do not produce any actuating signals for either of the relays 223 and 224. Accordingly, operation of the machine continues uninterrupted.

In a given operating cycle, however, it may happen that one of the two switches 94 and 95 closes, indicating introduction into the machine of a signature that did not come within the established operating limits. When this happens, one of the switches 94 or 95 is closed in the manner described above, and a pulse or input signal is applied to the storage device 202, actuating it to its second storage condition. No further action takes place during this calipering cycle of the machine. In the next operating cycle of the machine, the switch 203 is closed momentarily, applying a reset signal to the storage circuit 202. This resets the device 202 to its original storage condition and produces an output signal that is applied to the storage device 204 to actuate it from its normal operating condition to its second or storage condition. In the next operating cycle of the machine the storage device 204 is restored to its original operating condition by the reset signal supplied through the switch 203 and an output signal is produced that is applied to the storage unit 205 to actuate it to its second storage condition.

In the next operating cycle of the machine, the storage unit 205 is reset and an output signal is supplied to the storage unit 206 to actuate the latter from its normal to its second storage condition. At the same time, with the selector switch 217 set in the position shown in FIG. 6, an output signal is applied to the driver circuit 221 from the storage device 205 through the circuit comprising the selector switch 217 and the cam-actuated switch 220, which closes at a point in the operating cycle determined by the cams and coinciding with a part of the time when an output signal is available from device 205. As a consequence, the relay operating coil 222 is energized, closing the contacts 224 and energizing the solenoid 155 to interrupt the stitching operation during this machine cycle. This is timed to prevent stitching of the signature that has been determined to be outside the defined limits established by the sensing switches 94, 95. It will be seen from this that the number of storage units 202–204–205 will depend upon the number of machine cycles between calipering and stitching.

In addition, the output signal from the storage device 205 is supplied to the storage device 218 and actuates the latter to its second or storage condition. In the next machine cycle, the reset pulse applied to the storage devices 206 and 218 through the switch 203 resets the storage circuits. When reset, the storage device 218 produces an output signal that actuates the storage unit 219 to its second operating condition. Thereafter, when the storage unit 219 resets in the next operating cycle of the machine, an output signal is supplied to the driver circuit 232 through the selector switch 230 and the cam-actuated switch 231, which may be actuated simultaneously with the switch 220. In this cycle, therefore, the coil 233 is energized, closing the contacts 235 of the relay 234. This action is effective to energize the solenoid 236 which will set the switch delivery fingers (not shown) to cull the imperfect signature group.

The selector switch 217 makes it possible to actuate the stop-stitch solenoid 155 an integral number of machine cycles following the sensing of a defective signature by the switches 94 and 95, and to adjust this number of cycles to the operating timing or sequence of the machine. Thus, by changing the switch 217 to engage its contact 214, the energization of the solenoid 155 may be advanced one cycle, effectively eliminating the storage devices 205 and 206 from the circuit insofar as the control of machine operations is concerned. By the same token, if the selector switch 217 is shifted to engage the contact 216, the storage device 206 is effectively incorporated in the control circuit, and the energization of the stop stitch solenoid 155 is retarded by one complete machine cycle.

The same effect is achieved by the selector switch 230, with respect to the operation of the relay 234 and control of the associated solenoid 236. Thus, with the selector switch 230 in its illustrated position, a two-cycle delay is introduced in operation of the solenoid 236, but this can be reduced to one cycle by moving the selector switch 230 to its alternate operating position. The cam-actuated switches 230 and 231 make it possible to use the output signals from the storage and delay devices at any given fractional portion of a machine cycle, depending on the settings of the cams.

Figure 7:
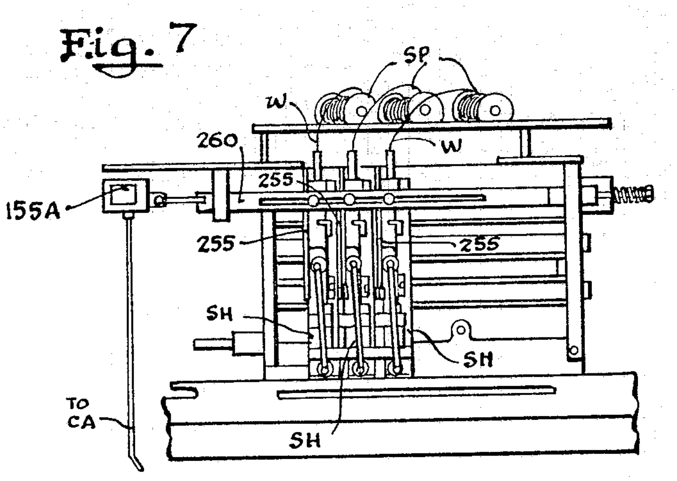
FIG. 7 is a schematic view of a portion of the stitching end of the machine as modified to include the wire feed control illustrated in FIG. 10.

Another and preferred method of preventing stitching of an improper signature group is illustrated in FIGS. 7 to 12. As in the foregoing embodiment, information that an improper signature group has been calipered is stored by means of the circuit described in connection with FIG. 6, and the timing is such that when the improper signature group reaches the stitching heads SH, a solenoid 155A, FIG. 7, is energized to prevent effective operation of the stitching heads. Specifically, effective operation of the stitching heads under such circumstances is avoided by removing the wire W from between the gripper elements 164 and 165.

Figures 8, 9:
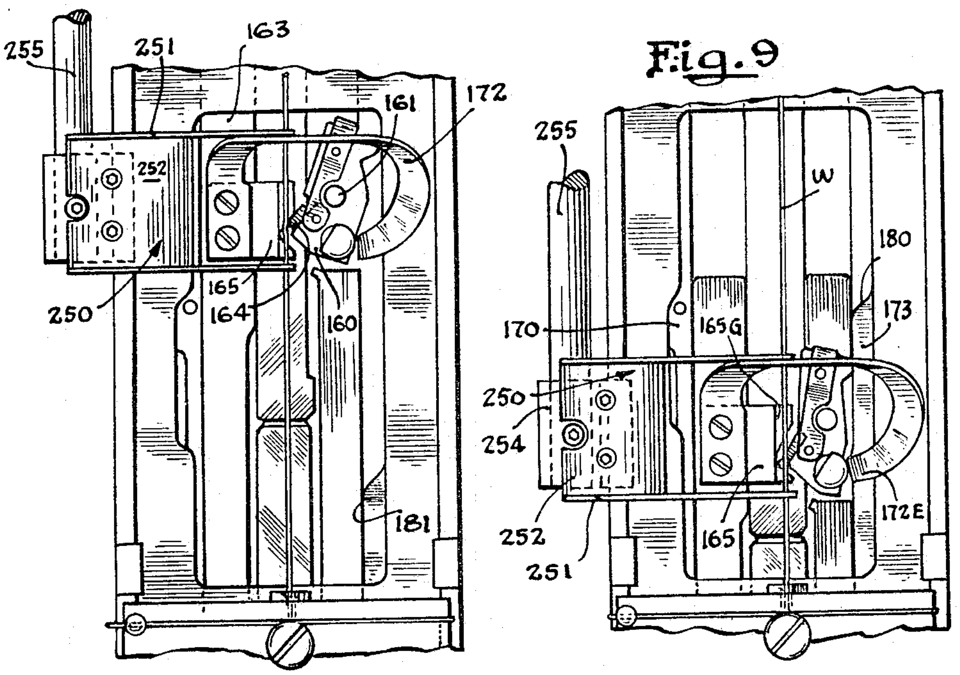
FIG. 8 is a fragmentary prespective view showing one position of the wire support yoke.
FIG. 9 is a perspective view similar to FIG. 8 but showing the wire support yoke in a different position.
Figures 10, 11, 12:
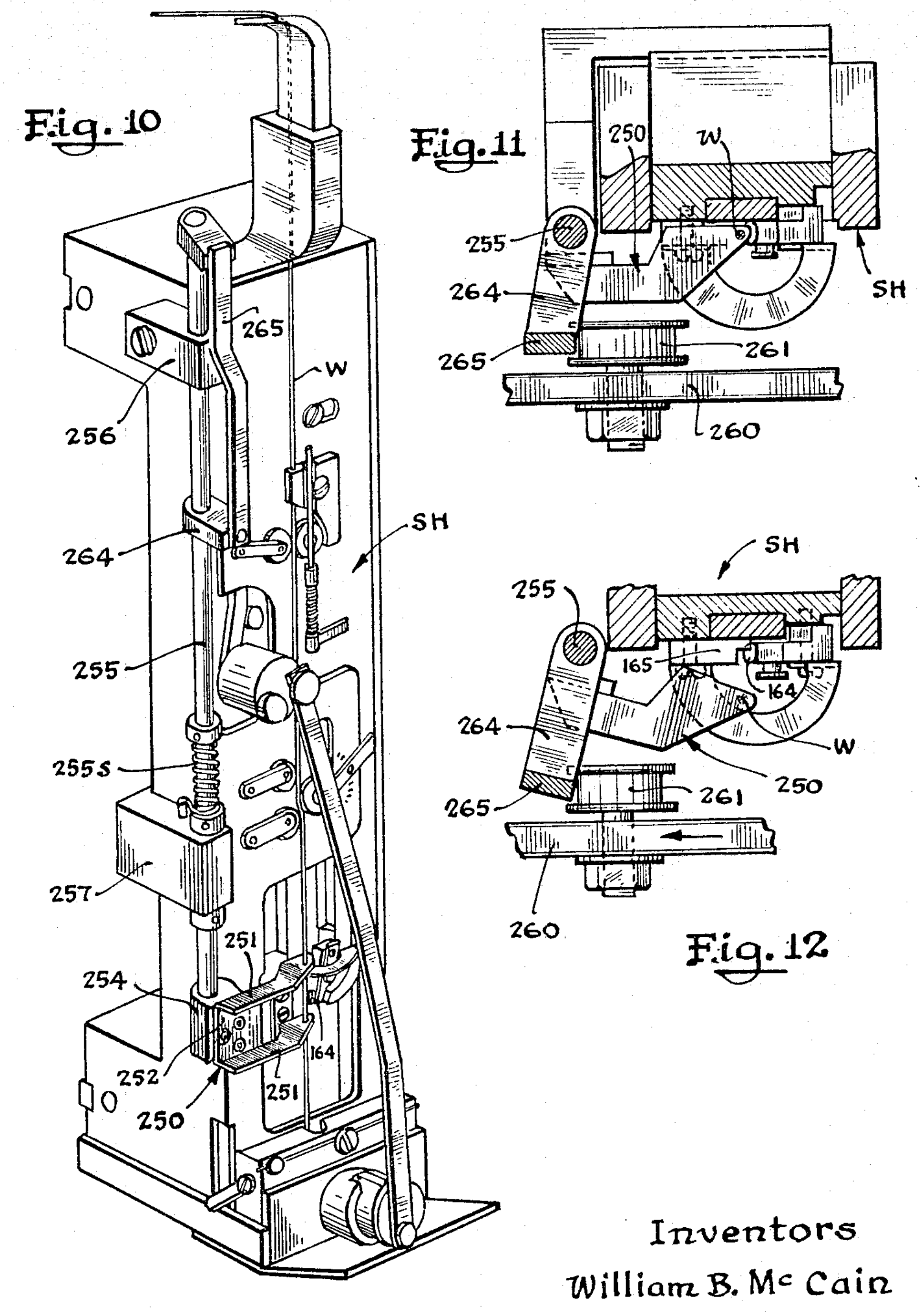
FIG. 10 is a perspective view of a stitching head equipped with a wire throw-out support yoke under the present invention.
FIGS. 11 and 12 are fragmentary sectional views showing the various positions of the wire throw-out yoke.

In accomplishing this result, the wire W for each stitching head is fed through a swingable guide 250, FIG. 10. The guide 250 is in the form of a yoke and includes a pair of arms 251 that are joined at one end by a plate 252. The arms 251 at the opposite ends are apertured as shown in FIG. 10, and the wire W is threaded therethrough. The arms 251 of the guide 250 embrace the leaf spring 172 and anvil 165 of the bender bar 163, as seen in FIGS. 8 and 9; and hence, the guide 250 reciprocates between the positions of FIGS. 8 and 9 with reciprocation of the leaf spring 172 and anvil 165.

The plate 252 is secured to a block 254 at the lower end of a vertically extending rock shaft 255 located in spaced supports 256 and 257 at one side of the gripper jaws 164 and 165. The yoke 250 is so related to the shaft 255 and the arms 251 are so configured that the wire W is vertically aligned with the bite between the gripper elements 164 and 165 so that in the normal position of the yoke 250, FIG. 11, the wire W is in position to be gripped and fed by the elements 164 and 165 in the manner described above. By turning the shaft 255 clockwise as viewed in FIG. 11, the yoke 250 will be swung or carried to the position shown in FIG. 12 whereat the wire W is displaced laterally from the feed jaw 164–165. This can be done by energizing solenoid 155A during the first half of the downstroke of the gripper elements 164–165 when the grippers are ordinarily effective to advance the wire for staple formation.

Thus, the solenoid 155A is arranged, when energized as above described, to apply a horizontal force to an actuating bar 260, FIGS. 7, 11 and 12. The bar 260 is provided with a plurality of rollers 261, as many as there are stitching heads to be controlled from a wire feed standpoint. In like manner, there are as many shafts 255 and related yokes 250 as there are stitching heads, and each shaft 255 is provided with a lug 264, FIG. 10, to which is fixed an upstanding pivot arm 265.

The upper end of each arm 265 is adjacent a roller 261. Specifically, each arm 265 is located on the solenoid side of each roller 261. Normally, each shaft 255 is biased to a counterclockwise position when the wire W is presented to grippers 164 and 165 for a normal stitch feed, and this bias is exerted by a torsion spring 255S, FIG. 19, related to the shaft 255 in the usual fashion of a torsion spring.

When the solenoid 155A is energized, the bar 260 is pulled to the left as viewed in FIGS. 7 and 11. As a consequence, each roller 261 is forced against each related pivot arm 265, and the corresponding shaft 255 is rocked clockwise thereby as viewed in FIG. 11, shifting the yoke 250 to a nonwire feed position. When the solenoid 155A is deenergized, the springs as 255S are effective to return the wire positioning, yokes or cradles 250 to the normal position illustrated in FIG. 11.

Hence, while preferred embodiments of the invention have been described and illustrated, it is to be understood that they are capable of variation and modification.

We claim:

1. In a machine wherein a wire staple is to be used to join sheets or the like, apparatus including a stapling head through which a wire is fed to be advanced to a staple forming position, reciprocal gripper jaws having a wire advancing stroke to so feed a wire through the head when the gripper jaws are closed on the wire, means for holding open the jaws during the return stroke thereof, a pivotal wire holder retaining the wire and normally presenting the wire to the gripper jaws; and means for pivoting said holder to displace the wire from said jaws during the open state of the latter when it is desired to prevent formation of a staple.

2. Apparatus according to claim 1 wherein the holder is supported on a rock shaft arranged at the side of the stitching head, and means for oscillating the rock shaft to pivot the holder including a lever on the rock shaft, and a solenoid for actuating the lever.

3. In a machine wherein a wire staple is to be used to join sheets or the like, apparatus including a staple head through which a wire is fed to a staple forming position, reciprocal gripper jaws having a wire advancing stroke to feed a wire through the head when the gripper jaws are closed on the wire, means for holding open the jaws during the return stroke thereof, means for holding the wire in position to be gripped by said gripper jaws and means for displacing said wire from said jaws during the open state of the gripping jaws to prevent the advancing of the wire during the reciprocation of said gripper jaws.

4. In a machine wherein a wire staple is to be used to join sheets or the like, apparatus including a staple head through which a wire is fed to a staple forming position, reciprocal gripper jaws having a wire advancing stroke to feed the wire through the head when the gripper jaws are closed on the wire, means for holding open the gripper jaws during the return stroke thereof, means pivotally mounted on said machine for holding the wire in position to be gripped by said gripper jaws, biasing means urging said pivotally mounted means to hold said wire in a position to be gripped, and selectively operable means for pivoting said pivotally mounted means against the urging of said biasing means to displace said wire from said jaws during the open state of the gripping jaws to prevent the closing of said grip jaws on said wire and the advancing of the wire and the formation of a staple during an advancing stroke of said gripper jaws.

5. The machine of claim 4 wherein said pivotally mounted means includes a plurality of spaced arms having apertures therein through which extends said stitching wire.

6. The machine of claim 5 wherein said selectively operable means includes a generally vertically disposed arm and a cam means movable in a generally horizontal direction to pivot said pivotally mounted arm about a generally vertical axis to move said wire from said position for gripping by said gripper jaws.

References Cited by the Examiner

UNITED STATES PATENTS

| | | | |
|---|---|---|---|
| 2,999,242 | 9/1961 | Young et al. | 227—3 XR |
| 3,204,846 | 9/1965 | Randall | 227—5 |

GRANVILLE Y. CUSTER, Jr., *Primary Examiner.*